United States Patent
Chongfuangprinya et al.

(10) Patent No.: US 11,379,274 B2
(45) Date of Patent: Jul. 5, 2022

(54) HYBRID SPATIAL-TEMPORAL EVENT PROBABILITY PREDICTION METHOD

(71) Applicant: Hitachi, Ltd., Tokyo (JP)

(72) Inventors: Panitarn Chongfuangprinya, San Jose, CA (US); Bo Yang, Santa Clara, CA (US); Yanzhu Ye, San Jose, CA (US); Yasushi Tomita, Los Altos, CA (US); Sumito Tobe, Ibaraki (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/428,427

(22) Filed: May 31, 2019

(65) Prior Publication Data

US 2020/0379824 A1 Dec. 3, 2020

(51) Int. Cl.
*G06F 9/54* (2006.01)
*G06N 7/00* (2006.01)
*H02J 3/00* (2006.01)
*G06F 17/18* (2006.01)

(52) U.S. Cl.
CPC .............. *G06F 9/542* (2013.01); *G06F 17/18* (2013.01); *G06N 7/005* (2013.01); *H02J 3/00* (2013.01); *H02J 2203/20* (2020.01)

(58) Field of Classification Search
CPC ......... G06F 9/542; G06F 17/18; G06N 7/005; H02J 3/00; H02J 2203/20
See application file for complete search history.

(56) References Cited

U.S. PATENT DOCUMENTS

| | | | | |
|---|---|---|---|---|
| 8,892,375 | B2 * | 11/2014 | Taft ...................... | G01R 25/00 700/286 |
| 9,230,289 | B2 | 1/2016 | Omitaomu et al. | |
| 9,395,707 | B2 * | 7/2016 | Anderson ............... | G06F 30/20 |
| 10,215,162 | B2 * | 2/2019 | Bai ......................... | F03D 17/00 |
| 2010/0131202 | A1 * | 5/2010 | Dannevik ............... | G01W 1/00 702/3 |
| 2011/0191284 | A1 * | 8/2011 | Dalton .................... | G06N 5/02 706/58 |
| 2015/0073759 | A1 * | 3/2015 | Vepakomma ......... | G06Q 50/265 703/6 |
| 2016/0004971 | A1 * | 1/2016 | Verkasalo .............. | G06N 20/00 706/12 |
| 2017/0011299 | A1 * | 1/2017 | Ebert ..................... | G06Q 10/06 |
| 2018/0053401 | A1 * | 2/2018 | Martin ................... | G08B 29/188 |

(Continued)

OTHER PUBLICATIONS

Dokic et al., ("Predictive Risk Management for Dynamic Tree Trimming Scheduling for Distribution Networks", IEEE, vol. 10, Issue 5, pp. 1-20, Sep. 3, 2018. (Year: 2018).*

*Primary Examiner* — S. Sough
*Assistant Examiner* — Phuong N Hoang
(74) *Attorney, Agent, or Firm* — Procopio, Cory, Hargreaves & Savitch LLP

(57) ABSTRACT

Example implementations described herein involve a hybrid spatial-temporal event probability prediction method and system configured to predict spatial-temporal event probability that can be utilized for short term planning. For systems such as utility systems that manage multiple locations over time, the example implementations utilize both a spatial model and a temporal model to create a hybrid spatial-temporal model that accounts for data taken over time as well as data across the locations to more accurately forecast the probability of an event occurrence over a period of time.

15 Claims, 15 Drawing Sheets

(56) References Cited

U.S. PATENT DOCUMENTS

2018/0159595 A1\* 6/2018 Johnson .................. H04B 3/58
2018/0330242 A1\* 11/2018 Dubois .................. G06N 7/005
2019/0228362 A1\* 7/2019 Anagnostou ............. G06N 5/02

\* cited by examiner

FIG. 6

HYBRID SPATIAL-TEMPORAL EVENT PROBABILITY PREDICTION METHOD

BACKGROUND

Field

The present disclosure is related to predictive analytics, and more specifically, for systems and methods for facilitating a hybrid spatial-temporal event probability prediction system and method.

Related Art

Utilities such as electrical utilities or telecommunication utilities are facing a high volume of interruptions or outage events or outages due to inclement weather in the last decades. Outages may cause by equipment failure where equipment deteriorates and no longer be able to provide service. However, major causes of outages are related to weather, such as high winds or storms that can cause damage to infrastructure or assets. These factors are considered as non-asset risk (NAR), which are typically overlooked or underestimated by conventional outage analysis methods. Planning involving only asset risk such as the current condition of the asset is not adequate. Spatial prediction for outage location due to NAR has become an important subject for several utilities. High NAR areas are often correlated with several factors especially density of vegetation, tree height, and wind speed, where optimal vegetation management could reduce the damage from severe weather conditions. Recently, the rising in availability of remote sensing technology such as Light Detection and Ranging (LiDAR) allows utility to utilize these types of spatial data more economically.

Historical outages data contain both location and time features. The outage probability prediction can be done in three different approaches:
(1) Temporal model (e.g. monthly outage probability within a service territory, daily outage probability within a service territory);
(2) Spatial model (e.g. outage probability for each area within a service territory); and
(3) Spatial-temporal model (e.g. outage probability for each area within a service territory for tomorrow).

Accumulating historical outages data over several years can provide a pattern of outages. A spatial outage probability prediction model is created by splitting data to two dimensions in a spatial space without considering the temporal aspect. Similarly, a temporal outage probability prediction model is created by splitting data to only one dimension in a temporal space without considering the spatial aspect. Both the spatial model and the temporal model can be done accurately by utilizing several years of historical outages data. However, creating a spatial-temporal outage probability prediction model is a challenge because the size of outages data diminishes drastically.

In a related art implementation, there is a method of modeling electric supply and demand for estimating spatial distribution of electric power outages and affected populations. Such methods include dividing a geographic area into cells to form a matrix and identifying supply cells and demand cells within the matrix. Such methods focus on applying related data to supply and demand cells. Weather data is applied to each cell divided geographically for estimating spatial distribution of power outage. Such methods also estimate power restoration by using historical information from each matrix. However, the related art implementations do not conduct weighting on a historical spatial map.

SUMMARY

Example implementations described herein involve a method to integrate (1) historical spatial outage information, (2) historical temporal outage information, and (3) recent spatial-temporal information to provide spatial-temporal outage prediction. Example implementations described herein are not limited to applications for utilities but it can be applicable to other events such as traffic accidents or crime events.

Example implementations involve a Hybrid Spatial-Temporal Event Probability Prediction method, to predict the spatial-temporal event probability for short-term planning.

Examples of events include outage events or outages. Example of an application includes short-term planning for utilities facing outages from NAR to optimize operation planning. Examples of short-terms can include one day or seven days ahead. Examples of utilities include electric utilities or telecommunication utilities. Examples of NAR include weather, high wind, high temperature, storm, wild fire, wild life, public. Example implementations are not limited to applications for utilities but can be applicable to other events such as traffic accidents or crime events.

At a high level, example implementations address the above problems with the related art by creating a spatial event probability prediction model and a temporal event probability prediction model separately and then merging both models into a single Hybrid Spatial-Temporal Event Probability Prediction model. Consequently, there is more data to train a spatial model and a temporal model separately and provide better accuracy to a Hybrid Spatial-Temporal Event Probability Prediction model.

In a more detailed level, example implementations involve receiving new spatial-temporal data; processing temporal data for the whole area; executing a temporal model for the whole area; storing temporal event probability for the whole area; processing spatial-temporal data for sub-areas; executing a temporal model for sub-areas; receiving new spatial data; processing spatial data layers; executing a spatial model; creating relative spatial-temporal event probability for short-term planning; processing relative spatial-temporal event probability for short-term planning; creating a conversion model; and creating spatial-temporal event probability for short-term planning.

For example, a spatial space of 25 km×25 km can be divided into 2,500 square grids for grid size of 500 m×500 m grid. Next, a spatial model may be built, trained, validated, tested, and optimized with spatial outage probability data created from ten years of historical outages data as a response variable and seven processed spatial data layers from (1) average elevation within a grid derived from LiDAR data, (2) maximum vegetation height within a grid derived from LiDAR data, (3) average vegetation density within a grid derived from LiDAR data, (4) overhead cable length within a grid, (5) underground cable length within a grid, (6) average wind speed at 50 m height within a grid, and (7) average wind speed at 80 m height within a grid as independent variables. In addition, a temporal model may be built, trained, validated, tested, and optimized with daily outage probability data created from ten years of historical outages data as a response variable and one feature such as maximum daily wind speed as independent variables. Furthermore, the temporal model is executed with processed data based on the spatial forecasted wind speed for the next day to produce the outage probability for the whole area for the next day and the relative outage probability for the next day for each of 2,500 individual square grids from temporal model. The spatial model is executed with processed data based on new spatial data to produce outage probability for each of the 2,500 individual square grids for long-term planning from the spatial model. Relative outage probability for the next day for each of the 2,500 individual square grids for short-term planning can be created from multiplication of relative outage probability for the next day for each of the 2,500 individual square grids from the temporal model and the corresponding outage probability for each of 2,500 individual square grids for long-term planning from the spatial model. The conversion model can be created by processing the outage probability for the whole area for the next day and the relative outage probability for the next day for each of the 2,500 individual square grids for short-term planning. Finally, the predicted outage probability for the next day for each of the 2,500 individual square grids for short-term planning based on spatial weather forecasting of the next day can be processed from multiplication of the relative outage probability for the next day for each of the 2,500 individual square grids for short-term planning and the conversion model.

BRIEF DESCRIPTION OF DRAWINGS

The detailed description is set forth with reference to the accompanying figures. The figures are examples and not intend to limit the scope of the claims. The use of the same reference numbers in different figures indicates similar or identical items or features.

FIG. 6 illustrates examples of neighborhood selection for a spatial event probability prediction model according to an example implementation.

DETAILED DESCRIPTION

Figure 1:
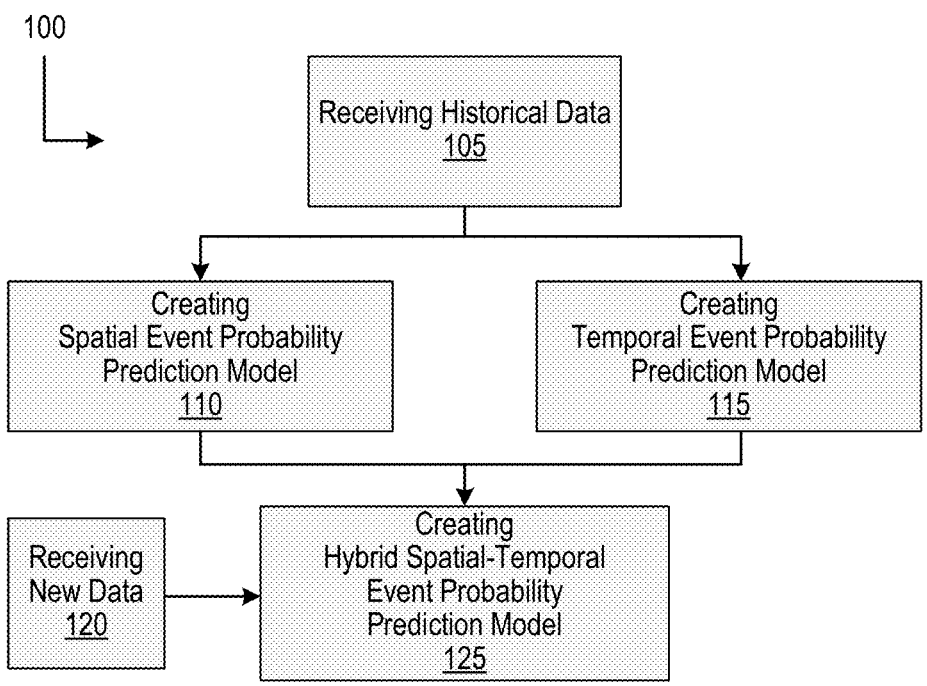
FIG. 1 is a flow diagram illustrating a Hybrid Spatial-Temporal Event Prediction method at high level according to an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to predicting spatial-temporal event probability for short-term planning. For example, short term planning by utilities facing outages from NAR to optimize operation planning. Examples of NAR include weather, high wind, high temperature, storm, wild fires, wild life interference, public interference and so on.

FIG. 1 is a flow diagram illustrating a Hybrid Spatial-Temporal Event Prediction method at high level according to an example implementation to provide the predicted spatial-temporal event probability for short-term planning. For example, the next day predicted outage probability in area A is 0.005 times per day.

The method 100 includes receiving historical data 105. For example, historical data may include historical outages data, historical weather data, historical geographical data, historical vegetation data, and historical asset data. Historical data may be time-series data, spatial data, temporal data, and/or spatial-temporal data.

The method 100 includes creating spatial event probability prediction model 110 and creating temporal event probability prediction model 115 separately based on data from the process of 105.

The method 100 also includes receiving new data 120. For example, new data may include forecasted weather data for tomorrow, current geographical data, current vegetation data, and current asset data. New data may be time-series data, spatial data, temporal data, and/or spatial-temporal data.

Finally, the method 100 includes creating hybrid spatial-temporal event probability prediction model 125 based on a spatial model from 110, a temporal model from 115, and new data from 120 to provide the predicted spatial-temporal event probability that can be utilized for short-term planning.

Figure 2:
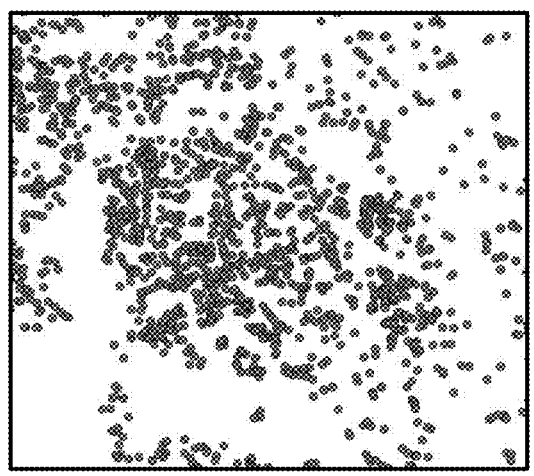
FIG. 2 illustrates an example of a map showing outage locations from 5 years of historical outages data, according to an example implementation.

FIG. 2 illustrates an example of a map showing outage locations from 5 years of historical outages data, according to an example implementation. Accumulating 5 years of historical outages data provides a pattern of outages. A map shows that (1) there are some concentrations of outages in certain areas especially in the middle of the map, (2) there is no outage in the bottom-left corner of the map, and (3) there are sparse outages in the top-right corner of the map.

Figure 3:
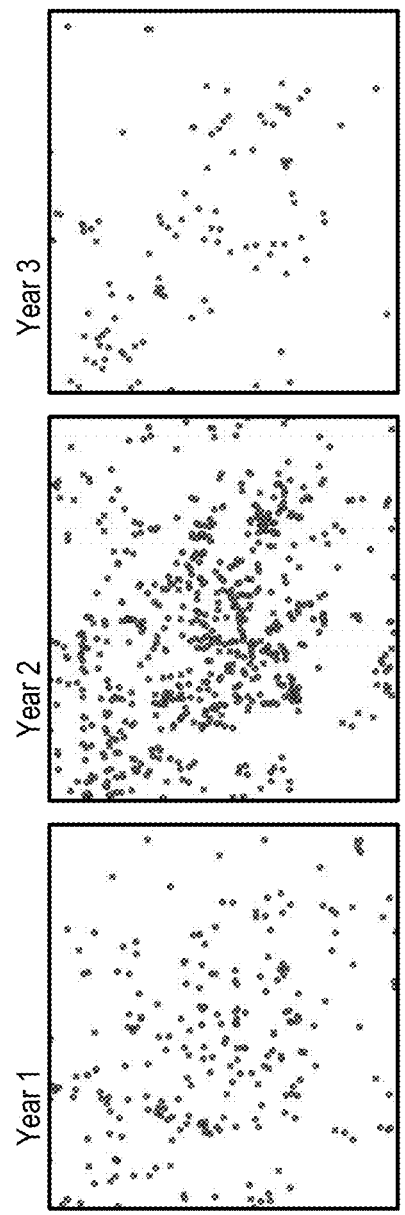
FIG. 3 illustrates examples of maps showing outage locations for Year 1, Year 2, and Year 3 out of 5 years of historical outages data, according to an example implementation.

FIG. 3 illustrates examples of maps showing outage locations for Year 1, Year 2, and Year 3 out of 5 years of historical outages data, in accordance with an example implementation. FIG. 3 shows more outages in Year 2 in comparison to Year 1 and Year 3. Year 2 provide a similar pattern of outage locations to FIG. 2 while Year 1 and Year 3 do not provide a distinct pattern for outages locations due to sparse data.

Figure 4:
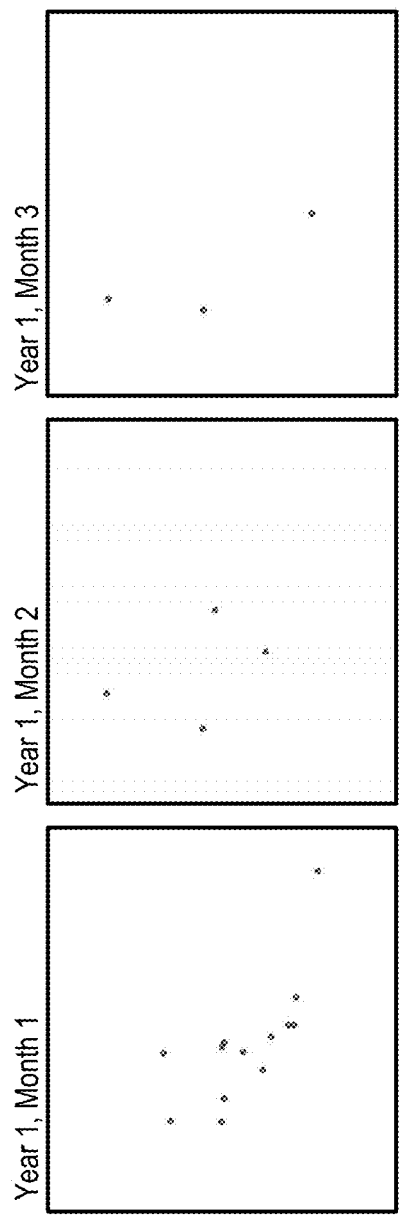
FIG. 4 illustrates examples of maps showing outage locations for Year 1 Month 1, Year 1 Month 2, and Year 1 Month 3 out of 5 years of historical outages data, according to an example implementation.

FIG. 4 illustrates examples of maps showing outage locations for Year 1 Month 1, Year 1 Month 2, and Year 1 Month 3 out of 5 years of historical outages data, in accordance with an example implementation. FIG. 4 does not provide a distinct pattern for outages locations due to sparse data.

Figure 5:
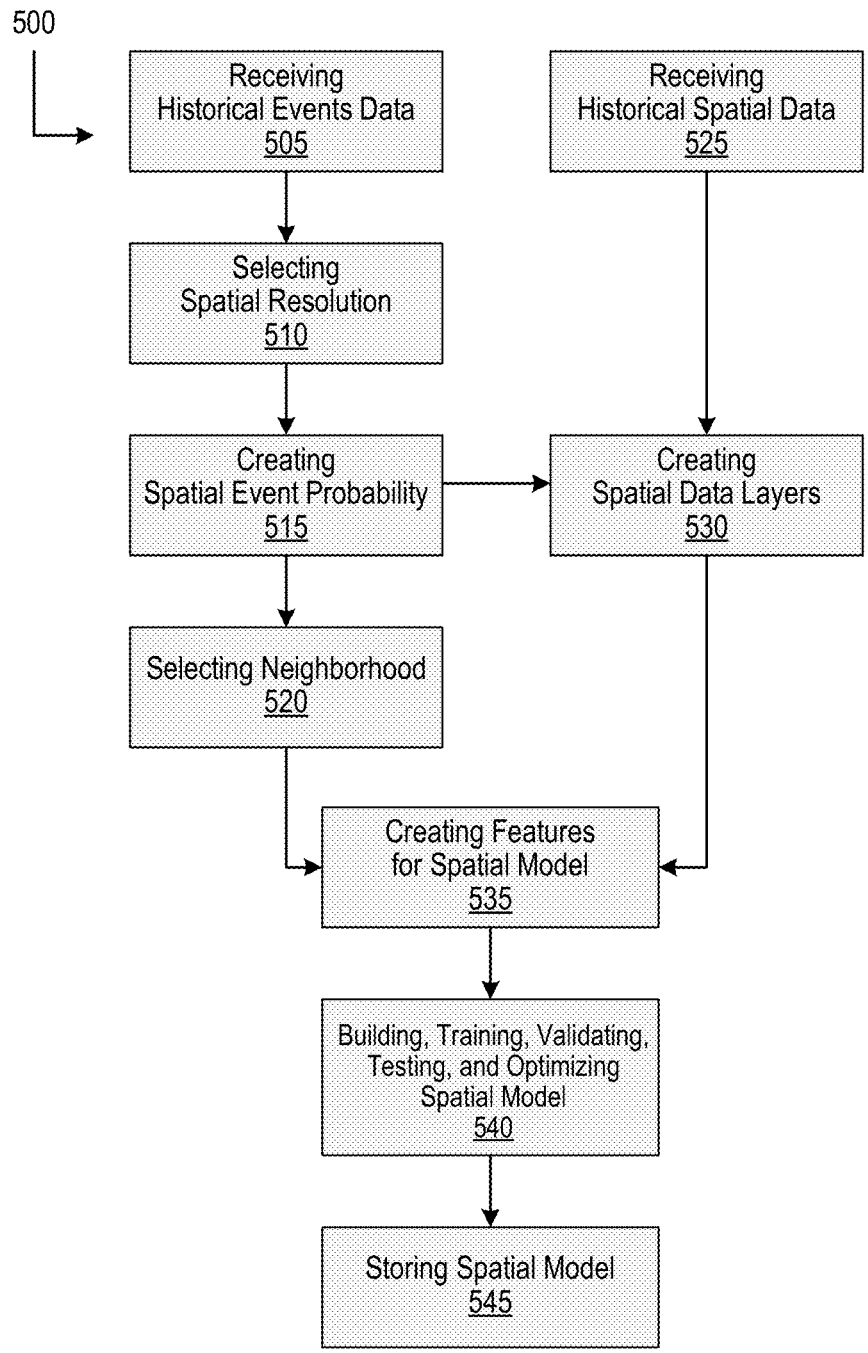
FIG. 5 is a flow diagram illustrating an example method for creating a spatial event probability prediction model according to an example implementation.

FIG. 5 is a flow diagram illustrating an example method for creating a spatial event probability prediction model according to an example implementation.

The method 500 includes receiving historical events data 505. Historical events data may include at least event locations, time of events, and causes of events. Additionally, or alternatively, historical events data may include a respective event duration, and impact. A relatively long time-span of historical events data is preferable to cover year over year variation. For example, ten years of historical outages data provides better coverage and insight than three years of historical outages data.

The method 500 includes selecting a spatial resolution 510 to split spatial space into sub-areas. For example, a spatial space of 25 km×25 km can be divided into 2,500 square grids for grid size of 500 m×500 m grid. The shape of the sub-areas is not limited to only square grid with the same size. For example, a spatial space can be divided into sub-areas base on five-digit ZIP codes or ZIP+4 codes.

The method 500 includes creating spatial event probability 515 based on historical events data to provide event probability for each sub-area from the process at 510. For example, spatial outage probability can be created for 2,500 square grids with a kernel density estimation (KDE) method based on filtered historical outages location that were related to only weather such as high winds or trees. KDE method interpolates outage locations with a probability density function (PDF). Outage probability decreases in locations that are further from the historical outage locations. Outage probability increases in overlapping areas when there are more outages in nearby historical outage locations. Another example is creating spatial outage probability by counting outage events in each grid. The counting method can provide a similar pattern, but not as smoothly as the KDE method. The spatial outage probability can be visualized by several methods such as a 2-D heatmap or a 3-D surface chart.

The method 500 further includes selecting neighborhood 520. Historical event locations are not fully independent in spatial space. Events at nearby locations tend to be more correlated than events at locations that are further away. This phenomenon is spatial dependency or spatial autocorrelation. Utilizing data from neighborhood areas can mitigate this phenomenon and increase the accuracy of a spatial event probability prediction model. However, increasing the number of neighborhoods may lead to a more complicated model and a longer time to train, test, validate, and execute the spatial model.

The method 500 includes receiving historical spatial data 525. For example, historical spatial data may include, but is not limited to weather data, geographical data, vegetation data, and infrastructure or asset data. Weather data may include historical average wind speed data from several years and several height levels. Infrastructure or asset data may include location, length, and type of asset such as above ground asset or underground asset.

The method 500 further includes creating spatial data layers 530 from data from the process of 525 according to the same selected spatial resolution and the same alignment as a spatial event probability created from the process at 515. Spatial data layers may be created by, but not limited to, operating historical spatial data such as the maximum value within a grid, average value within a grid, minimum value within a grid, or the summation of values within a grid. Historical spatial data may be processed with the nearest neighbor resampling method or the average value resampling method to make all data layers and a heatmap to the same resolution and same alignment. For example, processed data may include seven layers of spatial data as follows: (1) average elevation within a grid derived from LiDAR data, (2) maximum vegetation height within a grid derived from LiDAR data, (3) average vegetation density within a grid derived from LiDAR data, (4) overhead cable length within a grid, (5) underground cable length within a grid, (6) average wind speed at 50 m height within a grid, and (7) average wind speed at 80 m height within a grid.

The method 500 further includes creating features for spatial model 535 and building, training, validating, testing, and optimizing spatial model 540. The purpose of a spatial model is to predict the spatial event probability for sub-areas within the focus area based on data from the process at 515 and 530. For example, a spatial model may be built with 63 features based on a combination of (1) a center grid and eight neighborhood grids around the center grid in total of 9 grids from the process at 520 and (2) seven spatial data layers from the process at 530. Another example, a spatial model may be built with 175 features based on a combination of (1) a center grid and 24 neighborhood grids around the center grid in total of 25 grids from the process at 520 and (2) seven spatial data layers from the process at 530. Next, a spatial model may be trained, tested, and optimized base on machine learning technique such as but not limited to Support Vector Machines (SVM) or Artificial Neural Network (ANN).

The method 500 also includes storing a spatial model 545. The process at 545 stores a trained and optimized spatial model for further usage. For example, a spatial model may predict the spatial outage probability for sub-areas within a focus area based on different set of spatial layers. This spatial model may be utilized further in a hybrid spatial-temporal event probability prediction method according to an example implementation.

Figure 6:
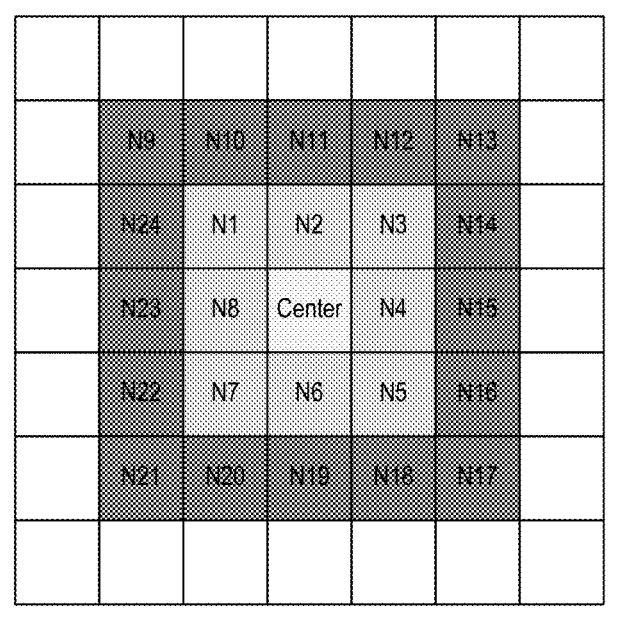

FIG. 6 illustrates examples of neighborhood selection for spatial event probability prediction model according to an example implementation. For the first example, a selection of 8 neighborhood grids including N1, N2, N3, . . . , N8, and a center grid in the middle in total of data from 9 grids to build the model. Another example is a selection of 24 neighborhood grids including N1, N2, N3, . . . , N24, and a center grid in the middle in total of data from 25 grids to build the model. Using data from 8 neighborhood grids around the center grid drastically improves the spatial model accuracy over using data only from the center grid. Using data from 24 neighborhood grids around the center grid slightly improves spatial model accuracy over using data only from 8 neighborhood grids while significantly increasing the time to train, test, validate, and execute the spatial model.

Figure 7:
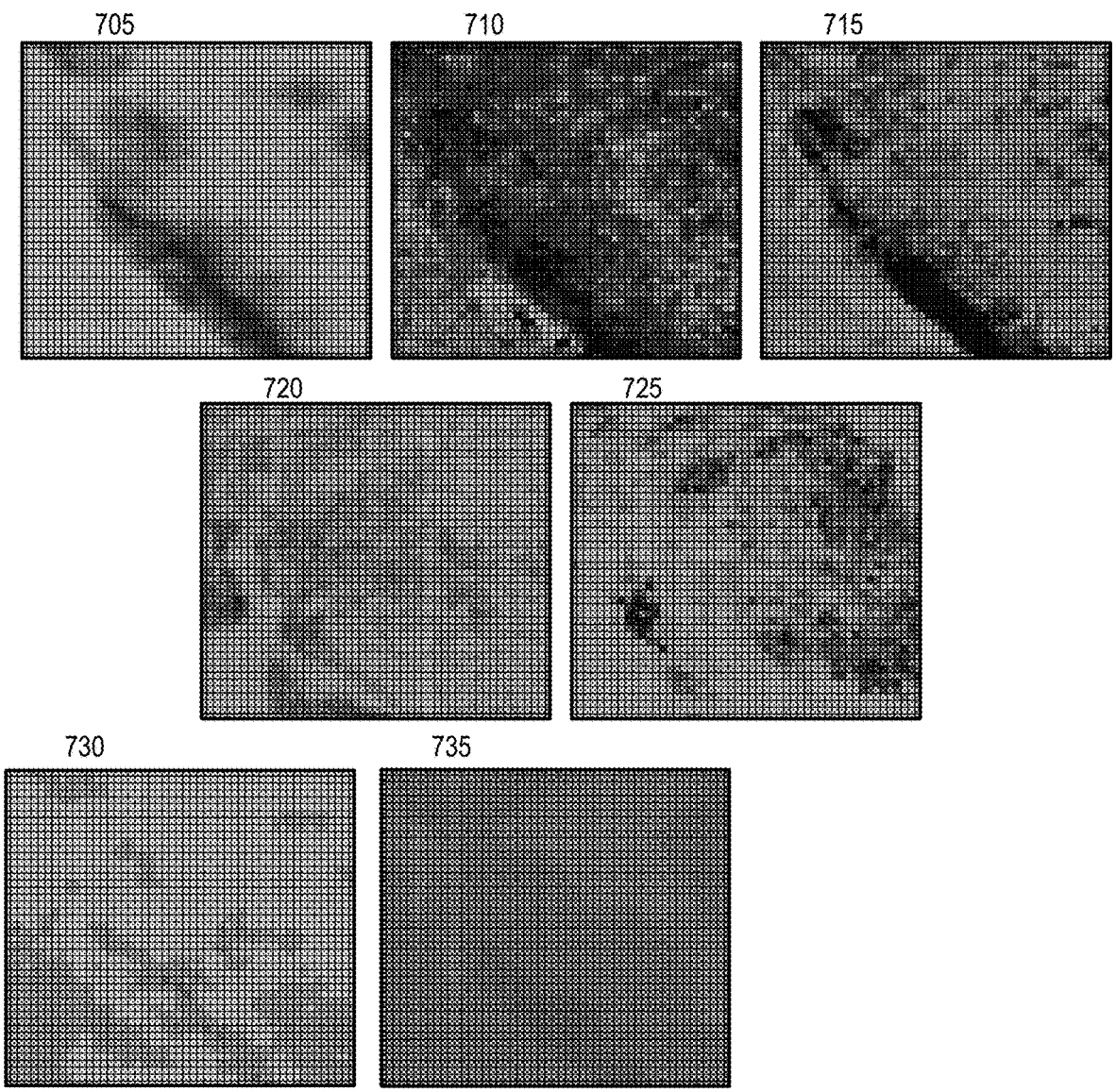
FIG. 7 illustrates example images of processed spatial data layers for a spatial model created by the method according to an example implementation.

FIG. 7 illustrates example images of processed spatial data layers for a spatial model created by the method, according to an example implementation. This example includes average elevation within a grid derived from LiDAR data 705, maximum vegetation height within a grid derived from LiDAR data 710, average vegetation density within a grid derived from LiDAR data 715, overhead cable length within a grid 720, underground cable length within a grid 725, average wind speed at 50 m height within a grid 730, and average wind speed at 80 m height within a grid 735. Darker shade represents relatively higher value within an image.

Figure 8:
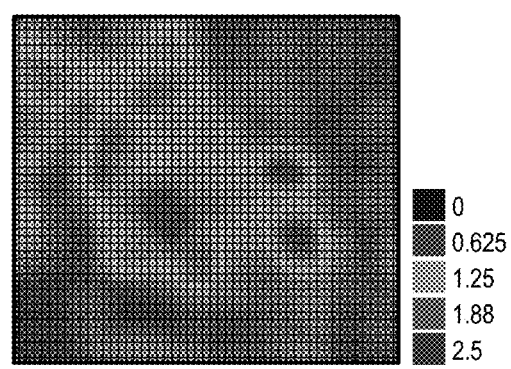
FIG. 8 illustrates an example of a 2-D heatmap created by a spatial event probability prediction model representing predicted spatial outage probability according to an example implementation.

FIG. 8 illustrates an example of a 2-D heatmap created by a spatial event probability prediction model representing the predicted spatial outage probability for each grid within a focus area based on an optimized SVM model trained with 5 years of historical data, in accordance with an example implementation. The legend on the right-hand side represent predicted outage probability per 5 years or predicted number of outages per 5 years.

Figure 9:
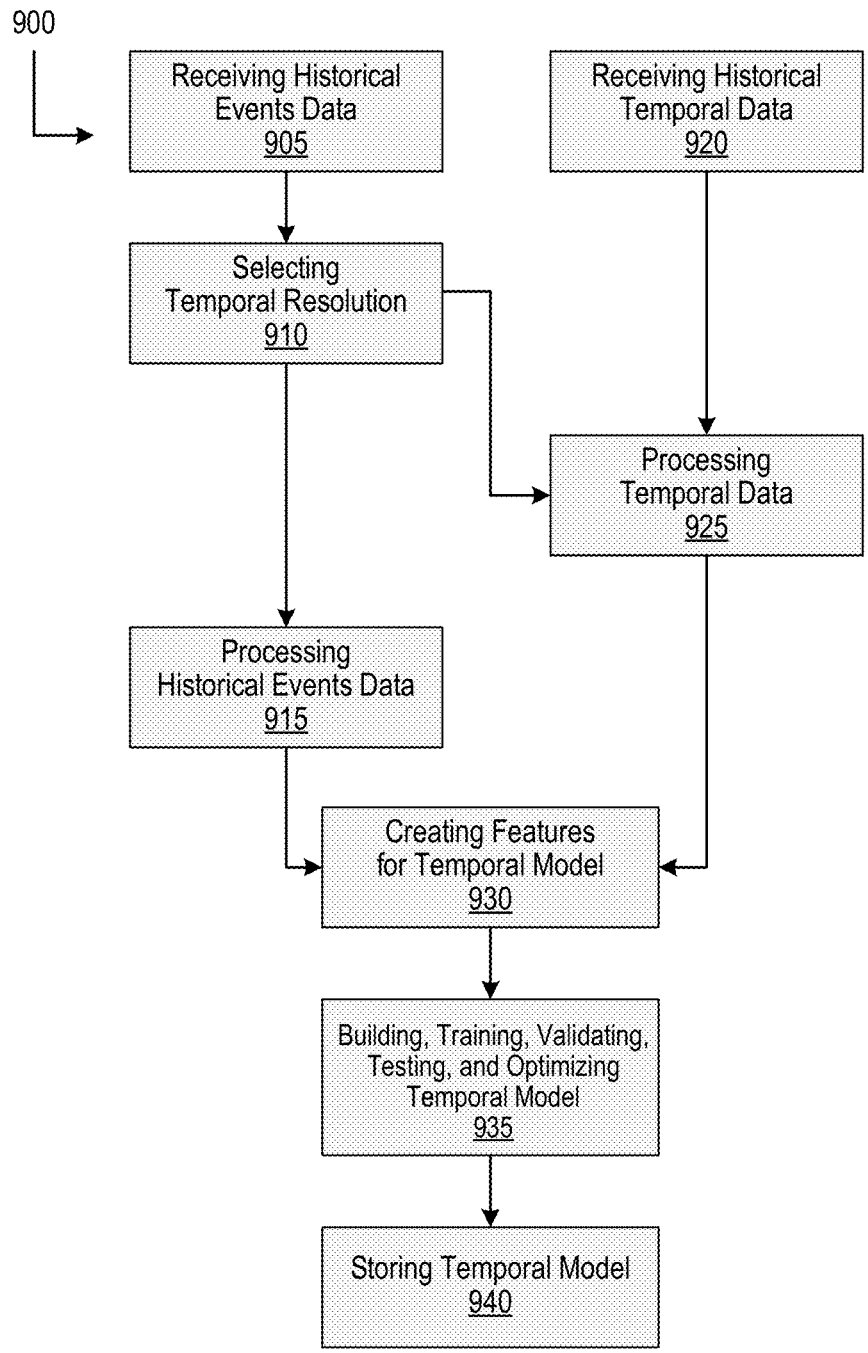
FIG. 9 is a flow diagram illustrating an example process for creating a temporal event probability prediction model according to according to an example implementation.

FIG. 9 is a flow diagram illustrating an example process for creating a temporal event probability prediction model according to an example implementation.

The method 900 includes receiving historical events data 905. Historical events data may include at least event locations, time of events, and causes of events. Additionally, or alternatively, historical events data may include respective event duration, and impact. A relatively long time-span of historical events data is preferable to cover year over year variation. For example, ten years of historical outages data provides better coverage and insight than three years of historical outages data.

The method 900 includes selecting temporal resolution 910 or time interval to divide data into smaller time interval and processing historical outages data 915 according to a selected time interval in the process of 910. For example, selection of daily temporal resolution divides 5 years of data into 1825 data sets. Historical outages data is aggregated on a daily basis such as frequency of outages per day.

The method 900 includes receiving historical temporal data 920. For example, historical temporal data may include but not limited to time-series of weather data such as hourly temperature, hourly humidity, hourly weather event, hourly wind speed, and hourly wind gust.

The method 900 further includes processing temporal data 925 according to selected temporal resolution from the process at 910 and from data in the process at 920. Temporal data may be created by operating historical temporal data such as maximum value within time interval, average value within time interval, minimum value within time interval, summation of value within time interval, true or false of event condition within time interval. For example, processed data may include maximum daily temperature, minimum daily temperature, maximum daily wind speed, minimum daily windspeed, maximum daily wind gust speed, minimum daily wind gust speed, true or false for a day with snow, true or false for a day with rain.

The method 900 further includes creating features for temporal model 930 and building, training, validating, testing, and optimizing temporal model 935. The purpose of a temporal model is to predict temporal event probability for time interval based on data from the process at 915 and 925. For example, a temporal model to predict daily outage probability can be built with only one single feature such as maximum daily wind speed or two features such as maximum daily temperature and maximum daily wind speed or more than 30 temporal features. Moreover, a temporal autocorrelation might exist in the historical outages data. Utilizing data from recent time slot can mitigate this problem and increase the accuracy of a temporal model. For example, a temporal model may be built with six features based on a combination of (1) 2 temporal data including maximum daily temperature and maximum daily wind speed and (2) 3-day time-series data including time t, time t−1 day, and time t−2 days. Next, a temporal model may be trained, tested, and optimized based on machine learning technique such as but not limited to Support Vector Machines (SVM), Artificial Neural Network (ANN), and Local Polynomial Regression Fitting.

The method 900 also includes storing a temporal model 940. The process at 940 stores a trained and optimized temporal model for further usage. For example, a temporal model may predict the next day outage probability based on the next day forecasted maximum daily temperature and maximum daily wind gust speed. This temporal model may be utilized further in a hybrid spatial-temporal outage probability prediction method according to an example implementation.

Figure 10:
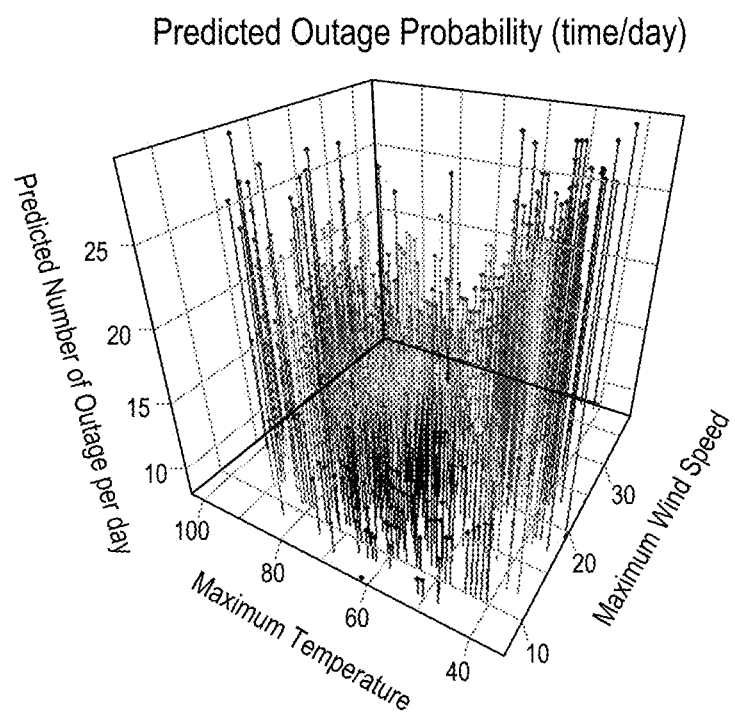
FIG. 10 illustrates an example of a three-dimensional chart created by a temporal outage probability prediction model representing predicted outage probability per day according to an example implementation.

FIG. 10 illustrates an example of a three-dimensional chart created by a temporal outage probability prediction model representing predicted outage probability per day. This tree-dimensional chart is representing predicted number of outages per day trained with 5 years of historical outages data, daily maximum wind speed data, and daily maximum temperature data created by the method of one embodiment of this invention.

Figure 11:
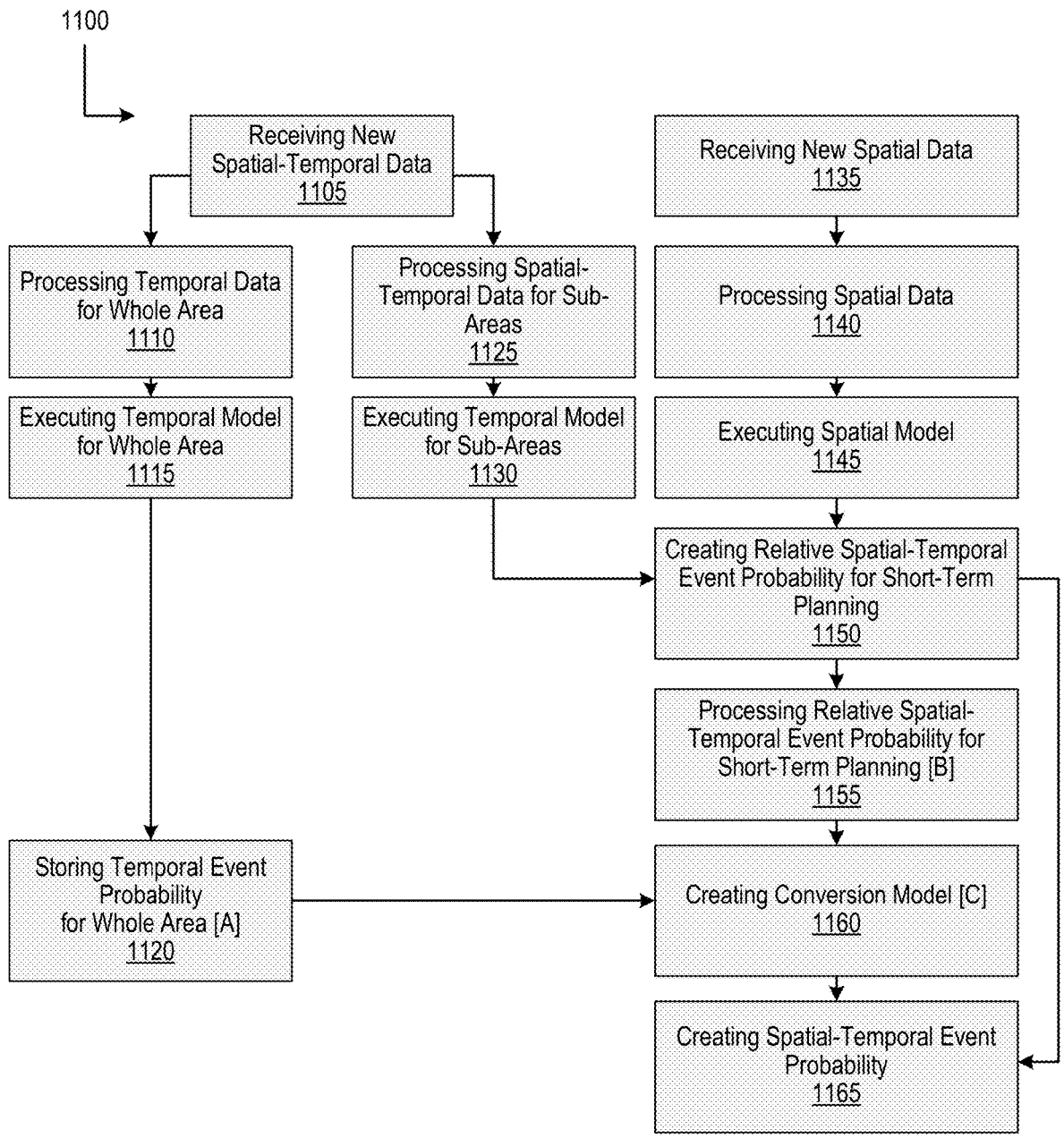
FIG. 11 is a flow diagram illustrating a Hybrid Spatial-Temporal Event Prediction method at detail level according to an example implementation to provide predicted spatial-temporal event probability for short-term planning.

FIG. 11 is a flow diagram illustrating a Hybrid Spatial-Temporal Event Prediction method at detail level according to one embodiment of this invention to provide predicted spatial-temporal event probability for short-term planning.

The method 1100 includes receiving new spatial-temporal data 1105. New spatial-temporal data may include but not limited to spatial short-term forecasted weather data such as spatial forecasted wind speed for the next day, and spatial forecasted temperature for the next day. Spatial resolution of short-term forecasted weather data may be higher or lower than the selected spatial resolution in the method of 500. Temporal resolution of short-term weather forecasting may be higher or lower than the selected temporal resolution in the method of 900.

The method 1100 includes processing temporal data for the whole area 1110 from data in the process of 1105 according to the same selected temporal resolution as a temporal model created in 900.

The method 1100 also includes executing the temporal model for the whole area 1115 to provide the predicted event probability for the whole area. For example, a temporal model created in 900 to predict the outage probability per day was built only from the maximum wind speed per day. The purpose of the process of 1110 is to find the maximum wind speed per day for the whole area from the spatial forecasted wind speed for the next day. Then, the outage probability for the whole area for the next day can be predicted by executing a temporal model in 900 with the maximum wind speed per day for the whole area.

The method 1100 further includes storing temporal event probability for the whole area 1120 for further processing. This number is denoted as [A].

The method 1100 also includes processing spatial-temporal data for sub-areas 1125 from data in the process 1105 according to the same selected spatial resolution and the same alignment as the spatial event probability prediction model created in the method 500. Spatial-temporal data may be processed with nearest neighbor resampling method or average value resampling method. For example, forecasted maximum wind speed for the next day is in 100 m×100 m grid resolution, then it is processed with nearest neighbor resampling method to achieve resolution of 500 m×500 m grid and align with a spatial model from 500.

In executing temporal model for sub-areas 1130, a trained and optimized temporal model from 900 is executed with spatial-temporal data for each sub-area. Because the temporal model is created from the whole area, executing the temporal model to each sub-area provides only the relative event probability per time interval for each individual sub-area and needs to be further processed and scaled according to historical spatial data. For example, the relative outage probability for the next day for each of 2,500 individual square grids from temporal model can be predicted individually by executing a temporal model from 900 with 2,500 individual values of the forecasted wind speed for the next day from 2,500 square grids.

The method 1100 includes receiving new spatial data 1135. New spatial data is the same type of spatial data using to build the spatial model as in method 500. However, the exact value within the data may not be the same as in method 500. Example of new spatial data are as follows:

The same historical spatial data as in method 500 if there is no change in data.

Data from actual change in vegetation density receiving from newly acquired LiDAR data.

Data from modification of historical spatial data layers for performing what-if analysis.

For example, if there is budget for vegetation management to reduce 30% average vegetation density, values in average vegetation density layer will be reduced by 30% as a new processed spatial layer. Another example is change in asset class due to conversion of asset from overhead cable to underground cable.

The method 1100 includes processing spatial data layers 1140 from data in the process at 1135 according to the same selected spatial resolution and the same alignment as a spatial model created in method 500.

In executing a spatial model 1145, a trained and optimized spatial model from 500 is executed with spatial data layers from step 1140 to provide prediction of spatial event probability based on new spatial data. An example of a result from step 1145 is the outage probability for each of the 2,500 individual square grids for long-term planning from spatial model that can be utilized by any utility facing outages from NAR to optimize investment and operation planning, such as an asset investment program and vegetation management plan. To provide the spatial-temporal event probability prediction that can be utilized for short-term planning, further processes are needed.

Additionally, the method 1100 includes creating the relative spatial-temporal event probability for short-term planning 1150 by processing data from the process at 1130 and 1145. For an example, the relative outage probability for the next day for each of 2,500 individual square grids for short-term planning can be processed from multiplication of the relative outage probability for the next day for each of 2,500 individual square grids from the temporal model in the process at 1130 and the corresponding outage probability for each of 2,500 individual square grids for long-term planning from the spatial model in the process at 1145.

The method 1100 includes processing relative spatial-temporal event probability for short-term planning 1155 for the whole area from data in the process at 1150. The result of this process is denoted with [B]. For an example, [B] is processed from summation of relative outage probability for the next day for each of 2,500 individual square grids for short-term planning.

The method 1100 includes creating conversion model 1160 by processing data from 1120 and 1155. For example, this conversion model is [A] divided by [B] or [A]/[B] and denoted as [C].

The method 1100 finally includes creating spatial-temporal event probability 1165 for short-term planning by processing data from the process at 1150 and 1160. The result from this process is the predicted event probability per time interval for each sub-area that can be utilized for short-term planning. For example, the predicted outage probability for the next day for each of the 2,500 individual square grids for short-term planning based on spatial weather forecasting of the next day can be processed from multiplication of the relative outage probability for the next day for each of 2,500 individual square grids for short-term planning from the process at 1150 and conversion model [C] from the process at 1160.

Figure 12:
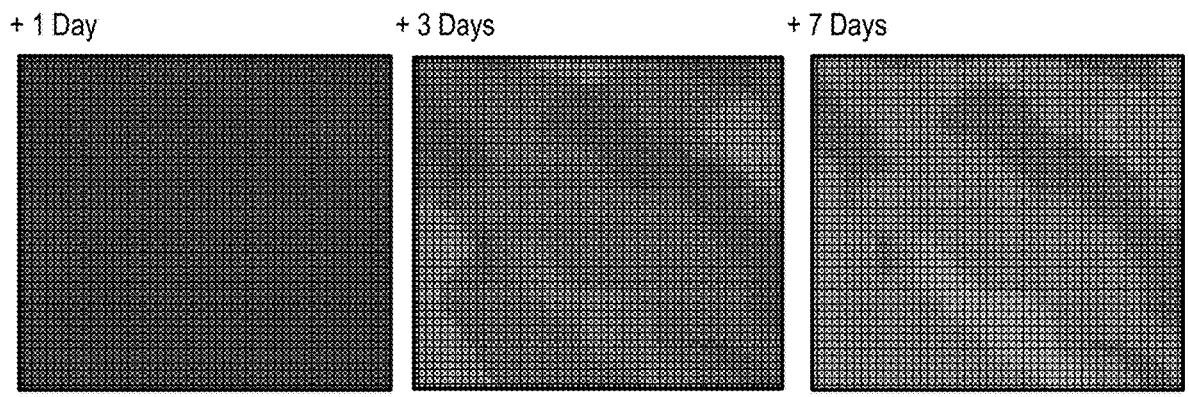
FIG. 12 illustrates examples of spatial weather forecasted data sets for +1 day, +3 days, and +7 days according to an example implementation.

FIG. 12 illustrates examples of spatial weather forecasted data sets for +1 day, +3 days, and +7 days, in accordance with an example implementation. These data sets are examples of spatial-temporal data received in 1105. The lighter color represents low wind speed and darker color represents high wind speed in a spatial space. A data set for +1 day shows relatively low wind speed while a data set for +7 day shows relatively higher wind speed in some certain areas.

Figure 13:
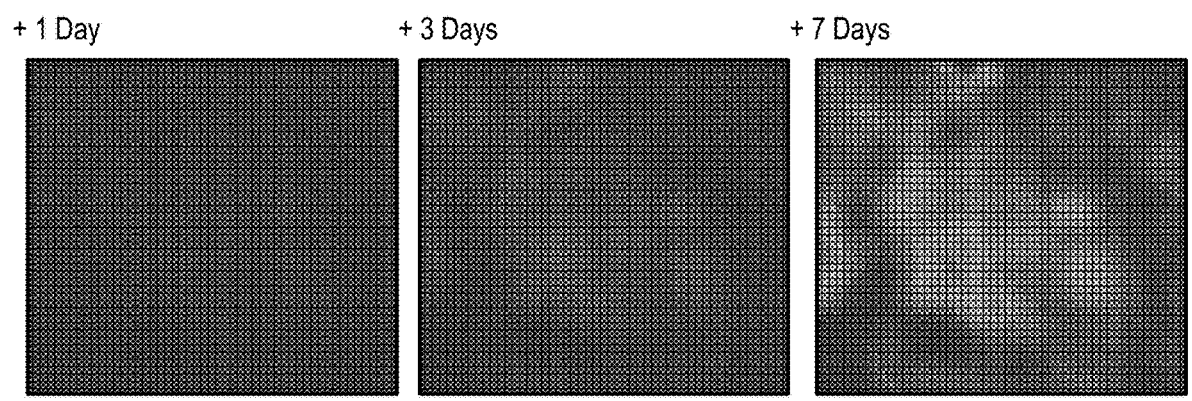
FIG. 13 illustrates corresponding examples of predicted spatial-temporal outage probability for short-term planning which are created by a method for +1 Day, +3 Days, and +7 Days according to an example implementation.

FIG. 13 illustrates corresponding examples of the predicted spatial-temporal outage probability for short-term planning which are created by a method according to an example implementation for +1 Day, +3 Days, and +7 Days based on data sets from FIG. 12. These results are examples of output from 1165. Lighter color represents a low outage probability and darker color represents a high outage probability in spatial space for each day. Results for +7 Day shows a relatively higher outage probability in some certain sub-areas in comparison with +1 Day.

Figure 14:
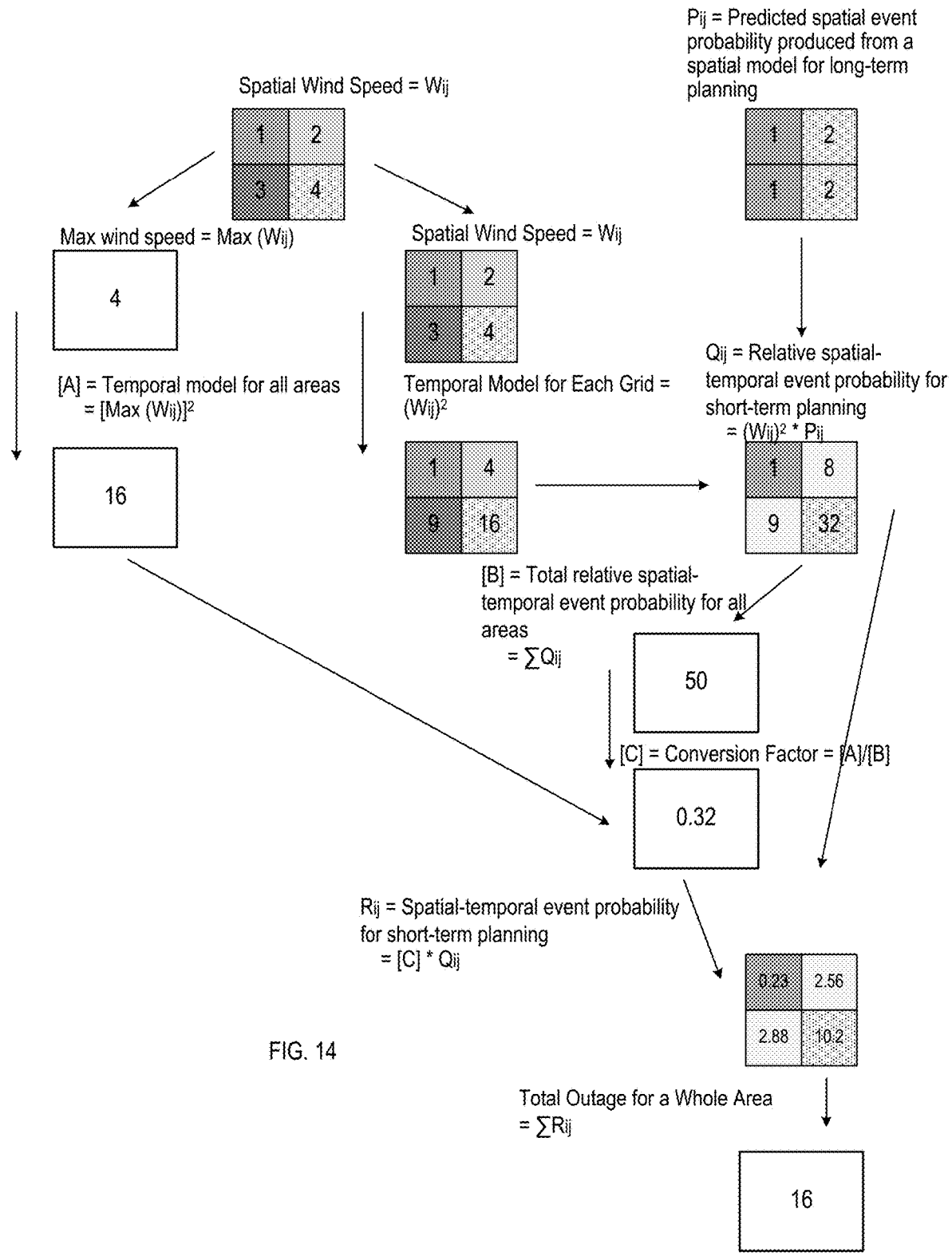
FIG. 14 illustrates an example of creating the conversion model, in accordance with an example implementation.

FIG. 14 illustrates an example of creating the conversion model, in accordance with an example implementation. Specifically, FIG. 14 illustrates an example of generated conversion models from the process of 1160. On the left side of FIG. 14, from the historical data of a utility system, suppose the historical spatial data involves wind information regarding the wind speed of one or more locations managed by the system (in this example, a utility system), with the average wind speed for each location weighted ($W_{ij}$) as illustrated in FIG. 14 based on magnitude (one region with a weight of 1, one region with a weight of 2, one region with a weight of 3, one region with a weight of 4). Such weights can be assigned in accordance with any desired implementation (e.g., raw average magnitude, normalized average magnitude, maximum magnitude recorded for the region, etc.). For the managed locations of the system, the maximum weight in the regions managed by the system is 4, and the temporal model for all of the locations managed by the system can be the maximum weight squared to result in [A] from FIG. 11, or otherwise depending on the desired implementation. The temporal model of each of the locations can be the weight squared (1, 4, 9, 16 as illustrated in FIG. 14).

From the execution of the spatial models on the historical spatial data, predicted spatial event probabilities $P_{ij}$ (e.g., the predicted probabilities of outages if the event to be monitored is outages in a utility system) can be determined for each location managed by the system. As illustrated in FIG. 14, an example output of the predicted spatial event probabilities for one or more locations are (1, 2, 1, 2). To get the normalized risk of event occurrence per location (e.g., outages), the product of the temporal model results and the predicted spatial event probabilities $P_{ij}$ are used, which results in the relative spatial-temporal event probability of event occurrence $Q_{ij}$ as (1, 8, 9, 32). The total relative spatial-temporal event probability for the locations managed by the system is determined from the summation of all locations to yield [B] from FIG. 11. Thus, the conversion factor [C] to be implemented on the raw event occurrence is derived from [A]/[B] to normalize the raw risk of event occurrence to take into account both the temporal model results and the spatial model results for each location.

The product of the conversion factor and $Q_{ij}$ yields the spatial-temporal event probability per location per time period (e.g., number of outages per day) $R_{ij}$. The summation of the spatial-temporal event probability per location per time period reflects the result derived from the temporal model, but incorporates the results from the spatial model to indicate weight factors for event occurrences per location per time period, thereby resulting in a hybrid-spatial temporal model that incorporates both the temporal model and the spatial model. Data received from the model can be considered as the hybrid spatial-temporal model (e.g., product of new data received regarding wind with the factors from the spatial-temporal model) to more accurately indicate risk of event occurrence at a location that takes into account both the spatial model and the temporal model.

Figure 15:
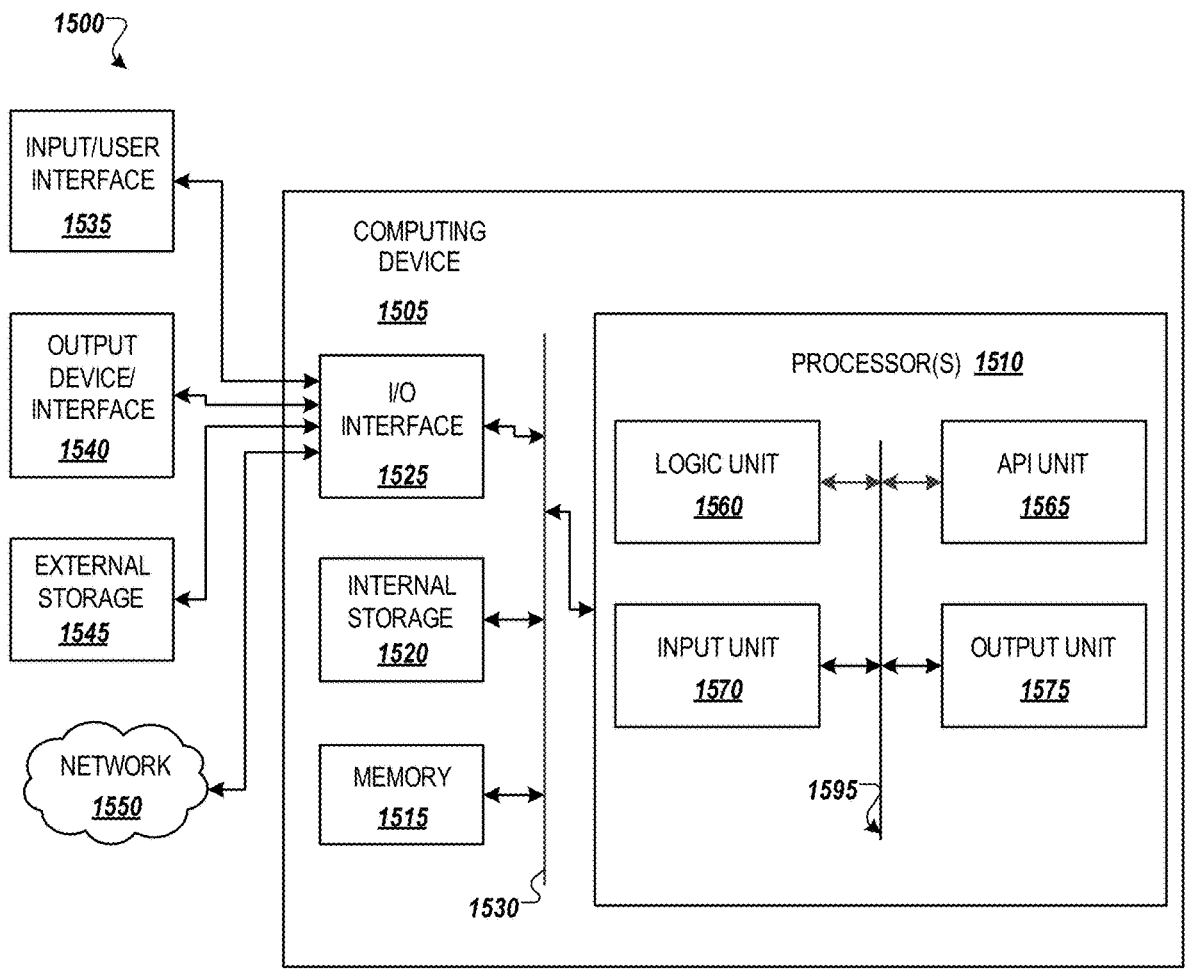
FIG. 15 illustrates an example computing environment with an example computer device suitable for use in some example implementations.

FIG. 15 illustrates an example computing environment with an example computer device suitable for use in some example implementations, such as an apparatus configured to conducting short-term event management for a system. Computer device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computer device 1505. I/O interface 1525 is also configured to receive images from cameras or provide images to projectors or displays, depending on the desired implementation.

Computer device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505.

Examples of computer device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1510 can execute under any operating system (OS) (not shown), in a native or virtual environment. One or more applications can be deployed that include logic unit 1560, application programming interface (API) unit 1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided. Processor(s) 1510 can be in the form of hardware processors such as central processing units (CPUs) or in a combination of hardware and software units.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, input unit 1570, output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide output based on the calculations described in example implementations.

Processor(s) 1510 can be configured to generate a spatial event probability prediction model and a temporal event probability prediction model from historical data of the system as illustrated in FIGS. 5 and 9; generate a hybrid spatial-temporal event probability prediction model from received data from the system, the spatial event probability prediction model and the temporal event probability prediction model; and for receipt of data from the system, execute the hybrid spatial-temporal event probability prediction model on the received data over one or more locations managed by the system to generate spatial temporal probabilities for the one or more locations managed by the system as illustrated in FIGS. 11-14.

In an example implementation, processor(s) 1510 can be configured to generate the spatial event probability prediction model by generating spatial event probabilities from a selected spatial resolution that is selected based on the historical events data; generating spatial data layers from the spatial event probabilities and historical spatial data; generating spatial model features based on the spatial data layers and a neighborhood selected based on the spatial event probabilities; and generating the spatial event probability prediction model from the spatial model features as illustrated in FIG. 5. In such an example implementation, the historical data can involve historical events data regarding one or more events that affected the one or more locations managed by the system (e.g., past outages for a utility system, past failures occurring at locations managed by a system, past occurrences of heat waves, etc.), and historical spatial data involving data regarding the locations managed by the system.

In an example implementation, the historical data can involve historical events data regarding one or more events that affected the one or more locations managed by the system, and historical temporal data can involve time-series data associated with the system (e.g., past sensor readings, past tree height level or density measurements, etc.). Processor(s) 1510 can be configured to generate the temporal event probability prediction model from the historical data of the system by: selecting a temporal resolution based on the historical events data (e.g., days, weeks months); generating temporal features based on a processing of the historical events data and the historical temporal data from the selected temporal resolution; and generating the temporal event probability prediction model from the temporal features as illustrated in FIG. 9.

In example implementations, the received data from the system can involve spatial data (e.g., locations and spatial-temporal data, wherein the processor(s) 1510 is configured to generate the hybrid spatial-temporal event probability prediction model from the received data, the spatial event probability prediction model and the temporal event probability prediction model by executing the spatial event probability prediction model on the spatial data and executing the temporal event probability prediction model on sub-areas of the spatial-temporal data to generate a relative spatial-temporal event probability for short-term planning; executing the temporal event probability prediction model on the spatial-temporal data over all areas of the system to generate temporal event probability for the all areas of the system; and generating a conversion model from the temporal event probability for the all areas of the system and from processing of the relative spatial-temporal event probability for short-term planning as the hybrid spatial-temporal event probability prediction model as illustrated in FIGS. 11-14.

In example implementations, the system can involve a utility system and the received data involving data associated with outage events of the utility system. In such example implementations, the processor(s) 1510 is configured to execute the hybrid spatial-temporal event probability prediction model on the data over one or more locations managed by the system by executing the generated hybrid spatial-temporal event probability prediction model on the data to generate spatial-temporal probabilities of the outages of the utility system over the one or more locations managed by the utility system; and for the generated spatial-temporal probabilities indicative of a location from the one or more locations managed by the utility system having an outage event probability exceeding threshold over a period of time indicated by the spatial-temporal probabilities, the processor is configured to schedule instructions to be dispatched to conduct maintenance on the location based on the outage event. Such instructions can involve, if there is expected to be an outage over the next time period (e.g., one week) in a particular location from the spatial-temporal model based on received data regarding tree height or tree density expected to damage overhead cables (e.g., power, telephony, etc.) in the region, the instructions can involve trimming or removing trees in that region over the period of time. If it involves the underground cables (e.g., power, telephony, fiber, etc.), then instructions can be dispatched to conduct maintenance on the underground cables for the one or more locations over the period of time.

Thus, as described above, in example implementations for a utility system, the received data from the system can involve one or more of tree height across the one or more locations managed by the system, tree density across the one or more locations managed by the system, and overhead cables in the one or more locations managed by the system. One of the main factors for causing damage to overhead cables and thereby causing outages in the system has involved tree height and tree density for locations having overhead cables, in particular when combined with particular weather conditions (e.g., wind) over time. Thus, the data received from the system can involve the measurements for the trees as made over time in a region so that both spatial models and temporal models can be made to predict outages.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for conducting short-term event management for a system, comprising:
   generating a spatial event probability prediction model and a temporal event probability prediction model from historical data of the system;
   generating a hybrid spatial-temporal event probability prediction model from data received from the system, the spatial event probability prediction model and the temporal event probability prediction model; and
   executing the hybrid spatial-temporal event probability prediction model on the received data over one or more locations managed by the system to generate spatial temporal probabilities for the one or more locations managed by the system;
   wherein the system is a utility system, the received data comprising data associated with outage events of the utility system, the method further comprising:
      wherein the executing the hybrid spatial-temporal event probability prediction model on the data over one or more locations managed by the system comprises executing the generated hybrid spatial-temporal event probability prediction model on the data to generate spatial-temporal probabilities of the outages of the utility system over the one or more locations managed by the utility system; and
      for the generated spatial-temporal probabilities indicative of a location from the one or more locations managed by the utility system having an outage event probability exceeding threshold over a period of time indicated by the spatial-temporal probabilities, scheduling instructions to be dispatched to conduct maintenance on the location based on the outage event;
   wherein the received data comprises spatial data and spatial-temporal data, wherein the generating the hybrid spatial-temporal event probability prediction model from the received data, the spatial event probability prediction model and the temporal event probability prediction model comprises:
      executing the spatial event probability prediction model on the spatial data and executing the temporal event probability prediction model on to each sub-area of all areas of the system to generate first results comprising a relative spatial-temporal event probability for the each sub-area of the one or more locations of short-term planning;
      executing the temporal event probability prediction model on the spatial-temporal data over all areas of the system to generate second results comprising temporal event probability for the all areas of the system; and
      generating a conversion model from the second results and from processing of the first results to generate the hybrid spatial-temporal event probability prediction model.

2. The method of claim 1, wherein the historical data comprises historical events data regarding one or more events that affected the one or more locations managed by the system, and historical spatial data comprising data regarding the locations managed by the system, the generating the spatial event probability prediction model comprising:

generating spatial event probabilities from a selected spatial resolution that is selected based on the historical events data;
generating spatial data layers from the spatial event probabilities and historical spatial data;
generating spatial model features based on the spatial data layers and a neighborhood selected based on the spatial event probabilities; and
generating the spatial event probability prediction model from the spatial model features.

3. The method of claim 1, wherein the historical data comprises historical events data regarding one or more events that affected the one or more locations managed by the system, and historical temporal data comprising time-series data associated with the system, the generating the temporal event probability prediction model from the historical data of the system comprising:
selecting a temporal resolution based on the historical events data;
generating temporal features based on a processing of the historical events data and the historical temporal data from the selected temporal resolution; and
generating the temporal event probability prediction model from the temporal features.

4. The method of claim 1, wherein the received data from the system comprises one or more of tree height across the one or more locations managed by the system, tree density across the one or more locations managed by the system, and overhead cables in the one or more locations managed by the system.

5. The method of claim 1, wherein the processing of the first results comprises conducting a summation of relative outage probability for a time period for each of the all areas of the system;
wherein the conversion model is configured to output spatial-temporal event probability for short-term planning indicative of an expected number of outages for the time period for the each of the all areas of the system.

6. A non-transitory computer readable medium, storing instructions for conducting short-term event management for a system, the instructions comprising:
generating a spatial event probability prediction model and a temporal event probability prediction model from historical data of the system;
generating a hybrid spatial-temporal event probability prediction model from received data from the system, the spatial event probability prediction model and the temporal event probability prediction model; and
executing the hybrid spatial-temporal event probability prediction model on the received data over one or more locations managed by the system to generate spatial temporal probabilities for the one or more locations managed by the system;
wherein the system is a utility system, the received data comprising data associated with outage events of the utility system, the instructions further comprising:
wherein the executing the hybrid spatial-temporal event probability prediction model on the data over one or more locations managed by the system comprises executing the generated hybrid spatial-temporal event probability prediction model on the data to generate spatial-temporal probabilities of the outages of the utility system over the one or more locations managed by the utility system; and
for the generated spatial-temporal probabilities indicative of a location from the one or more locations managed by the utility system having an outage event probability exceeding threshold over a period of time indicated by the spatial-temporal probabilities, scheduling instructions to be dispatched to conduct maintenance on the location based on the outage event;
wherein the received data comprises spatial data and spatial-temporal data, wherein the generating the hybrid spatial-temporal event probability prediction model from the received data, the spatial event probability prediction model and the temporal event probability prediction model comprises:
executing the spatial event probability prediction model on the spatial data and executing the temporal event probability prediction model on to each sub-area of all areas of the system to generate first results comprising a relative spatial-temporal event probability for the each sub-area of the one or more locations of short-term planning;
executing the temporal event probability prediction model on the spatial-temporal data over all areas of the system to generate second results comprising temporal event probability for the all areas of the system; and
generating a conversion model from the second results and from processing of the first results to generate the hybrid spatial-temporal event probability prediction model.

7. The non-transitory computer readable medium of claim 6, wherein the historical data comprises historical events data regarding one or more events that affected the one or more locations managed by the system, and historical spatial data comprising data regarding the locations managed by the system, the generating the spatial event probability prediction model comprising:
generating spatial event probabilities from a selected spatial resolution that is selected based on the historical events data;
generating spatial data layers from the spatial event probabilities and historical spatial data;
generating spatial model features based on the spatial data layers and a neighborhood selected based on the spatial event probabilities; and
generating the spatial event probability prediction model from the spatial model features.

8. The non-transitory computer readable medium of claim 6, wherein the historical data comprises historical events data regarding one or more events that affected the one or more locations managed by the system, and historical temporal data comprising time-series data associated with the system, the generating the temporal event probability prediction model from the historical data of the system comprising:
selecting a temporal resolution based on the historical events data;
generating temporal features based on a processing of the historical events data and the historical temporal data from the selected temporal resolution; and
generating the temporal event probability prediction model from the temporal features.

9. The non-transitory computer readable medium of claim 6, wherein the received data from the system comprises one or more of tree height across the one or more locations managed by the system, tree density across the one or more locations managed by the system, and overhead cables in the one or more locations managed by the system.

10. The non-transitory computer readable medium of claim 6, wherein the processing of the first results comprises conducting a summation of relative outage probability for a time period for each of the all areas of the system;
   wherein the conversion model is configured to output spatial-temporal event probability for short-term planning indicative of an expected number of outages for the time period for the each of the all areas of the system.

11. An apparatus configured to conducting short-term event management for a system, the apparatus comprising:
   a processor, configured to:
      generate a spatial event probability prediction model and a temporal event probability prediction model from historical data of the system;
      generate a hybrid spatial-temporal event probability prediction model from received data from the system, the spatial event probability prediction model and the temporal event probability prediction model; and
      execute the hybrid spatial-temporal event probability prediction model on the received data over one or more locations managed by the system to generate spatial temporal probabilities for the one or more locations managed by the system;
   wherein the system is a utility system, the received data comprising data associated with outage events of the utility system;
      wherein the processor is configured to execute the hybrid spatial-temporal event probability prediction model on the data over one or more locations managed by the system by executing the generated hybrid spatial-temporal event probability prediction model on the data to generate spatial-temporal probabilities of the outages of the utility system over the one or more locations managed by the utility system; and
      for the generated spatial-temporal probabilities indicative of a location from the one or more locations managed by the utility system having an outage event probability exceeding threshold over a period of time indicated by the spatial-temporal probabilities, the processor is configured to schedule instructions to be dispatched to conduct maintenance on the location based on the outage event;
   wherein the received data comprises spatial data and spatial-temporal data, wherein the processor is configured to generate the hybrid spatial-temporal event probability prediction model from the received data, the spatial event probability prediction model and the temporal event probability prediction model by:
      executing the spatial event probability prediction model on the spatial data and executing the temporal event probability prediction model on to each sub-area of all areas of the system to generate first results comprising a relative spatial-temporal event probability for the each sub-area of the one or more locations of short-term planning;
      executing the temporal event probability prediction model on the spatial-temporal data over all areas of the system to generate second results comprising temporal event probability for the all areas of the system; and
      generating a conversion model from the second results and from processing of the first results to generate the hybrid spatial-temporal event probability prediction model.

12. The apparatus of claim 11, wherein the historical data comprises historical events data regarding one or more events that affected the one or more locations managed by the system, and historical spatial data comprising data regarding the locations managed by the system, the processor configured to generate the spatial event probability prediction model by:
   generating spatial event probabilities from a selected spatial resolution that is selected based on the historical events data;
   generating spatial data layers from the spatial event probabilities and historical spatial data;
   generating spatial model features based on the spatial data layers and a neighborhood selected based on the spatial event probabilities; and
   generating the spatial event probability prediction model from the spatial model features.

13. The apparatus of claim 11, wherein the historical data comprises historical events data regarding one or more events that affected the one or more locations managed by the system, and historical temporal data comprising time-series data associated with the system, the processor configured to generate the temporal event probability prediction model from the historical data of the system by:
   selecting a temporal resolution based on the historical events data;
   generating temporal features based on a processing of the historical events data and the historical temporal data from the selected temporal resolution; and
   generating the temporal event probability prediction model from the temporal features.

14. The apparatus of claim 11, wherein the received data from the system comprises one or more of tree height across the one or more locations managed by the system, tree density across the one or more locations managed by the system, and overhead cables in the one or more locations managed by the system.

15. The apparatus of claim 11, wherein the processing of the first results comprises conducting a summation of relative outage probability for a time period for each of the all areas of the system;
   wherein the conversion model is configured to output spatial-temporal event probability for short-term planning indicative of an expected number of outages for the time period for the each of the all areas of the system.

* * * * *